Nov. 9, 1954  A. W. RICHARDS ET AL  2,693,832
BELT-DRIVEN HAND SAW
Filed Oct. 9, 1950
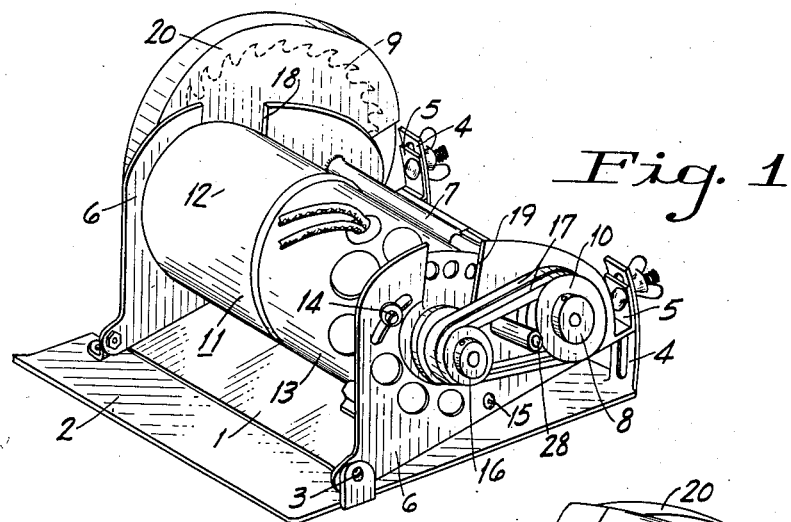
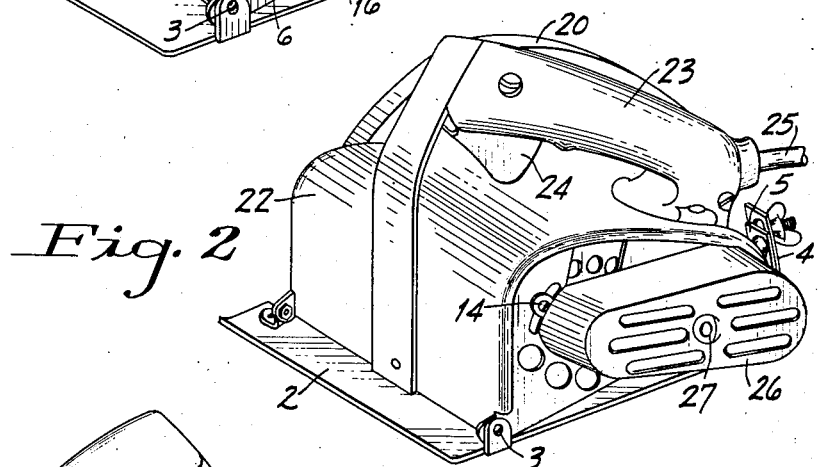
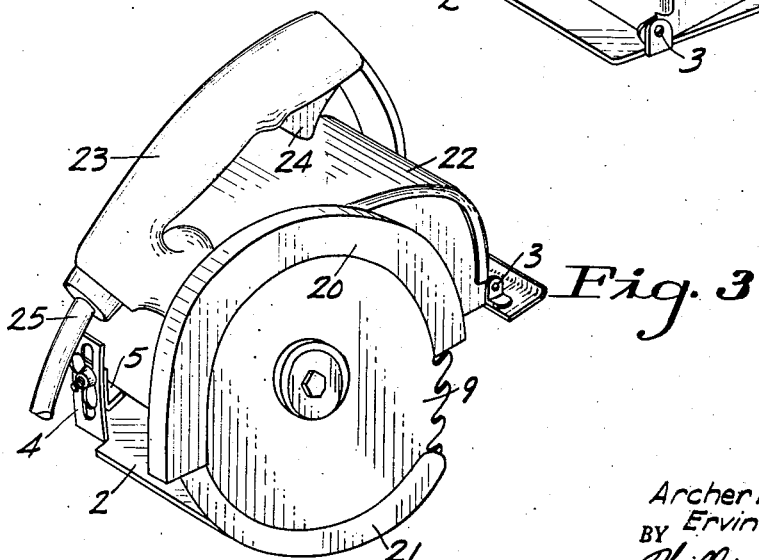
INVENTOR.
Archer W. Richards and
BY Ervin J. Osterhus
Their Attorney.

United States Patent Office

2,693,832
Patented Nov. 9, 1954

2,693,832

BELT-DRIVEN HAND SAW

Archer W. Richards, Chagrin Falls, and Ervin J. Osterhus, Cleveland, Ohio, assignors to Syntron Company, Homer City, Pa., a corporation of Delaware Application October 9, 1950, Serial No. 189,116

2 Claims. (Cl. 143—43)

This invention relates generally to motor-operated hand saws, and more particularly to belt-driven hand saws.

This invention is an improvement on the belt-driven hand saw as disclosed in application for United States Letters Patent, Serial No. 142,066, filed February 2, 1950, now Patent No. 2,671,476 issued March 9, 1954.

The belt-driven hand saw disclosed in the aforementioned application requires the saw shaft to be in front of the motor shaft. The handle for controlling and manipulating the saw is positioned directly above the motor and extends over to the saw shaft. The base of this hand saw has nothing on it from the position of the saw shaft to its forward edge. However, this section of the base is necessary to properly support the saw shaft ahead of the motor shaft. It is not necessary for good operation to have the wood engaging surface of the base extend to the rear of the saw unless the motor is positioned behind the saw and its shaft. In the disclosure of the aforementioned application the base actually extends beyond the saw at the front and the rear.

The principal object of this invention is to provide an improved structure wherein the base does not extend beyond both ends of the saw blade and thereby provide a more compact and better balanced saw.

Another object is the provision of a compact belt-driven hand saw wherein the motor driving the saw is mounted with its armature parallel with that of the saw shaft and in front of the same so as to conserve space to make the saw unit more compact and at the same time provide a smaller saw that is more readily controlled and manipulated.

Another object is the provision of a novel mode of adjustably supporting the motor of the belt-driven hand saw to take up the tension of the belt.

Another object is the provision of a mounted handle for controlling the movements of the hand saw in such a way as to balance the weight and gyratory effect of the saw to make it easier to manipulate.

Another object is the provision of a motor-operated belt-driven hand saw mounted with the motor ahead of the saw shaft and the center of the handle positioned above and between them to maintain a greater portion of the mass in front of the handle.

Other objects and advantages appear hereinafter in the following description and claims.

The accompanying drawings show for the purpose of exemplification without limiting the invention and claims thereto, certain embodiments of the invention wherein:

Fig. 1 is a perspective view showing the saw member with the cover removed and showing the motor together with the belt drive of the hand saw comprising this invention.

Fig. 2 is a perspective view of a hand saw comprising this invention showing the complete saw member.

Fig. 3 is a perspective view showing the opposite side of the hand saw as shown in Fig. 2.

Referring to the drawings the base 1 is stamped from a single piece of sheet metal which is of sufficient gauge to provide a proper rigidity when formed into a saw base. An adjustable work-engaging plate 2 is pivoted to the base 1, as indicated at 3, and extends beyond the rest of the saw and may be turned upwardly at the front and the rear of the plate 2 does not extend beyond the saw. The rear of the plate has a pair of upwardly extending arms 4 with a slot therein to receive the bolts on the ears 5 of the base 1. Thus by hingedly adjusting the relative position of the plate 2 to the base 1, one may determine the depth of the saw cut. The sides of the base 1 are bent upwardly to form the side walls 6, each of which has an upwardly open slot and is perforated to permit the circulation of air. The upwardly projecting sides 6 are connected by the tube 7 which is welded thereto and makes the base structure rigid. This tube has journaled therein a saw shaft 8 which extends beyond the sides 6 and at one end has secured thereto the saw member 9 and at the other end the dual V-belt pulley member 10.

The electric motor 11 is encased in the cup-shaped housing shells 12 and 13, which shells are provided with flanges where they come together so that they may be secured to each other for the purpose of holding the motor in assembled relation. The shells 12 and 13 are provided with aligned bearings for rotatably supporting the armature. One end of the motor shaft extends beyond the shell 13 to receive the dual V-belt driving pulleys 16. The V-belt pulleys 10 and 16 are connected by the V-belts 17 for the purpose of driving the saw 9. The motor 11 is pivotally secured to the sides 6 by means of the pivot bolts 15. The sides 6 are provided with upwardly opened slots 18 and 19 to receive the ends of the motor caps or shells 12 and 13 and each of the sides 6 is provided with an adjusting screw 14 which is received in a threaded hole in the ends of the shells 12 and 13 for the purpose of clamping the motor in its adjusted position when the proper tension is on the belts 17.

A semi-circular guard 20 covers the top half of the saw 9 and is secured to the side wall of the base 1. This guard is sufficiently large to permit the movable guard 21 to telescope therein. This movable guard 21 is journaled on the shaft 8 and is biased by a spring to extend over most of the lower part of the saw 9.

The saw parts are enclosed by the housing 22 which has flanges fitting over the sides 6. The housing is secured to the base 1 and takes the general contour of the sides 6. A grip handle 23 is shaped to fit the housing 22 with one end low over the saw shaft and the other end high over the motor, thus positioning the hand between the saw shaft and the motor shaft with the handle sloping upwardly. This provides a very compact mechanism as the saw housing closely follows the saw shaft and motor, allowing very little clearance as the motor and saw shaft are also closely coupled and are as close to the base as the casings 12 and 13 and the pulley 10 allow. The handle is provided with a rigid extension which re-inforces the housing 22 down the front of the saw.

The handle 23 carries the finger switch 24 which connects the motor with the electric service line 25, which is ordinarily provided with a plug member that may be conveniently inserted in any suitable electrical outlet.

The V-belts 17 are enclosed by the casing 26 which is held in place by the screw 27 inserted in the end of the post 28 that is secured to the side 6 as shown in Fig. 1.

It will be noted that the saw blade itself projects rearwardly beyond any other portion of the saw and the motor is in front and a portion of the plate 2 projects forwardly beyond any other portion of the saw. However the weight of the motor leads the saw and it is necessary to have a leading portion of the base on this side of the saw. This construction provides a very compact and materially lighter saw structure which is more readily maneuverable by reason of the fact that the motor, which represents the greatest weight of the saw, actually leads the saw itself. Such an arrangement of parts represents a material improvement in the structure and operating feasibility of this saw which is highly important in a hand tool of this character, particularly when it is necessary to use such a hand tool while on a scaffolding or in precarious places on a new construction.

While, for clarity of explanation, certain preferred embodiments of this invention have been shown and described, it is to be understood that this invention is capable of many modifications, and changes in the construction and arrangement may be made therein and certain parts may be employed with conjoint use of other parts and without departing from the spirit and scope of this invention.

I claim:

1. A power driven hand saw device comprising a base, a high speed motor mounted on said base and positioned closely adjacent to said base, a rotary saw shaft mounted behind the motor in the direction of feeding the saw and closely adjacent said base and said motor, the axes of said motor and said saw shaft lying parallel with said base and with each other, belt power transmission means connecting said motor and said saw shaft, and handle means for manipulating said hand saw, a guard to cover the upper portion of the saw and mounted on the base to lie in a plane transverse to the motor axis and overlying a portion of the end of said motor, a greater portion of the mass of the hand saw leading the saw shaft when sawing.

2. A power driven hand saw device comprising a base, a high speed motor mounted on said base and positioned closely adjacent to said base, a rotary saw shaft mounted behind the motor in the direction of feeding the saw and closely adjacent said base and said motor, the axes of said motor and said saw shaft lying parallel with said base and with each other, belt power transmission means connecting said motor and said saw shaft, and handle means for manipulating said hand saw, a circular saw mounted on said saw shaft to lie in a plane transverse to the motor axis and overlying a portion of the end of said motor, a greater portion of the mass of the hand saw leading the saw shaft when sawing.

References Cited in the file of this patent

UNITED STATES PATENTS

| Number | Name | Date |
|---|---|---|
| 1,170,454 | Magerkurth | Feb. 1, 1916 |
| 1,464,351 | Casey | Aug. 7, 1923 |
| 1,568,328 | French | Jan. 5, 1926 |
| 1,663,486 | Wertz | Mar. 20, 1928 |
| 1,830,579 | Wappat | Nov. 3, 1931 |
| 1,899,204 | Matthews | Feb. 28, 1933 |
| 1,900,336 | Egan | Mar. 7, 1933 |
| 2,346,961 | Gundelfinger et al. | Apr. 18, 1944 |
| 2,381,489 | Dietz | Aug. 7, 1945 |
| 2,573,991 | Schildknecht | Nov. 6, 1951 |

FOREIGN PATENTS

| Number | Country | Date |
|---|---|---|
| 736,593 | France | Nov. 25, 1932 |